United States Patent [19]
Walton

[11] Patent Number: 5,844,479
[45] Date of Patent: Dec. 1, 1998

[54] AUTOMOTIVE, FRONT AND SIDE BRAKE/ RUNNING/TURN SIGNAL LIGHT

[76] Inventor: Edward B. Walton, 3400 NW. 20th St., Oklahoma City, Okla. 73107

[21] Appl. No.: 496,040

[22] Filed: Jun. 28, 1995

[51] Int. Cl.⁶ ..................................................... B60Q 1/44
[52] U.S. Cl. .......................... 340/479; 340/475; 340/469; 340/464
[58] Field of Search .................................. 340/479, 475, 340/473, 472, 471, 469, 468, 467, 464, 463

[56] References Cited

U.S. PATENT DOCUMENTS

| | | | |
|---|---|---|---|
| 1,307,286 | 6/1919 | Wesolek | 340/464 |
| 1,346,567 | 7/1920 | Stover | 340/464 |
| 1,553,959 | 9/1925 | Pirkey | 340/464 |
| 1,577,113 | 3/1926 | Velasco | 340/464 |
| 1,806,276 | 5/1931 | Bailey | 340/464 |
| 2,120,288 | 6/1938 | McCready | 340/464 |
| 2,190,123 | 2/1940 | Pace | 340/464 |
| 2,553,462 | 5/1951 | Mann | 340/464 |
| 2,750,578 | 6/1956 | Petrella et al. | 340/464 |
| 3,109,158 | 10/1963 | Coombs | 340/464 |
| 3,364,384 | 1/1968 | Dankert | 340/464 |
| 3,601,794 | 8/1971 | Bloomenkamp | 340/467 |
| 3,665,392 | 5/1972 | Annas | 340/479 |
| 3,784,974 | 1/1974 | Hamashige | 340/464 |
| 4,231,013 | 10/1980 | Freeman et al. | 340/479 |
| 4,290,046 | 9/1981 | Chabot | 340/468 |
| 4,661,795 | 4/1987 | Cameron | 340/479 |
| 4,952,909 | 8/1990 | Woerner et al. | 340/479 |
| 5,111,183 | 5/1992 | Wang | 340/479 |
| 5,253,115 | 10/1993 | Ueno | 340/479 |
| 5,497,304 | 3/1996 | Caine | 340/469 |

Primary Examiner—Jeffery Hofsass
Assistant Examiner—Nina Tong
Attorney, Agent, or Firm—Bruce A. Jagger

[57] ABSTRACT

The present invention is a front mounted, combination brake/signal/turn signal light. In one embodiment, an assembly with three light chambers is provided. The light in one chamber is connected to the ignition and brake circuits of the vehicle. Connection is made so that this first light lights when the vehicle is operating and goes out when the brakes are applied. The light in the second chamber is connected to the brake circuit of the vehicle. This second light is lighted whenever the brakes are applied. The light in the third chamber is connected to the turn signal circuit of the vehicle. The preferred colors are blue for the stop signal, white or clear for the daytime running lights and amber for the turn signal. Thus the assembly provides a visual signal that is white whenever the vehicle is in operation, changes from white to blue when the brakes are applied, changes from blue back to white again when the use of brakes is terminated and in addition flashes amber when the vehicle is turning. Two lamp variations of this embodiment are also described. The first lamp is connected to the brake circuit while the second may be connected to the brake/ignition circuits or the turn circuit. Illumination may be provided by regular incandescent lights, fiber optic cable, LEDs, or electrochromic elements. Colors may be provided by multicolored lenses or by appropriate circuitry to the illuminating element.

17 Claims, 7 Drawing Sheets ns to the front and other
drivers when the driver has applied his brake. None of these
prior workers suggest combining the front brake light with
the turn or running light of the automobile in order to
provide a change in visual signal to the front and side as the
brakes are being applied. These and other disadvantages of
the prior art have been overcome according to the present
invention.

AUTOMOTIVE, FRONT AND SIDE BRAKE/RUNNING/TURN SIGNAL LIGHT

BACKGROUND OF THE INVENTION

The present invention relates to the field of vehicle lighting and more particularly to signal lights for road vehicles such as, for example, passenger vehicles, motorcycles, construction and maintenance vehicles, farm equipment, trucks, busses, and the like.

All vehicles which travel on public roads are provided with a variety of lights which provide visual signals to pedestrians and other drivers on the roads. Currently, vehicles have stop lights, turn lights, headlights and running lights. Stop lights are generally only provided on the rear of the vehicles and are usually colored red. They provide a visual indication, primarily from the rear, that the brakes are being applied (i.e. that the vehicle is slowing rapidly). Turn signals are provided on the front and rear and are usually yellow or amber. Turn signals usually flash and provide a visual indication from the front, rear and sides that the vehicle is turning or intending to turn. Headlights are located on the front of the vehicle and, while they are primarily intended to illuminate the roadway at night, they also provide a visual clue to the direction of travel of the vehicle. Headlights are clear or white and are usually only used at night, but may be illuminated during the day for safety purposes. Running lights are frequently provided on the front, rear and sides of vehicles, particularly trucks. Running lights are generally amber or red, depending on location. They can generally be switched on or off at will and also provide a visual clue, especially at night and from the side, of the size of the vehicle and its direction of travel.

It can be seen that one important visual signal is missing: an indication from the front and side that the vehicle is slowing. Front mounted brake signal systems have been proposed by previous workers. See, for example, Technical Memorandum HuF-TM-1, "Subjective Evaluation of the Front-Mounted Braking Signal" by D. V. Post and R. G. Mortimer of the Highway Safety Research Institute of the University of Michigan, where apparently amber colored, front windshield mounted brake lights were tested.

Expedients proposed by previous workers in this field include, for example, Pirkey U.S. Pat. No. 1,553,959, issued Sep. 15, 1925, which appears to suggest manually operated, switch controlled turn and brake signal lamps for the front and rear of a vehicle. Bailey U.S. Pat. No. 1,806,276, issued May 19, 1931, generally describes a manually operated indicator lamp box consisting of three chambers including lamps and moveable reflectors in each chamber, and translucent stencil markings at the front which appears to be meant to be attached inside the windshield. In U.S. Pat. No. 2,190,123, issued Feb. 13, 1940, Pace generally proposes a manually activated indicator lamp box intended to be mounted in a vehicle, approximately in the area of the rear view mirror, to indicate to pedestrians to the front of the vehicle that the driver is yielding the right of way to the pedestrians. In U.S. Pat. No. 3,364,384, issued Jan. 16, 1968, Dankert generally proposes a signaling system for depicting a vehicle driver's actions. The proposed system apparently consists of a specially designed light, mounted someplace on the front of the vehicle, connected to sensors within. The light provides different colored visual signals depending upon whether the vehicle is at constant speed, accelerating, or decelerating. Annas has proposed, in U.S. Pat. No. 3,665,392, issued May 23, 1972, a driver communication signal light mounted on the front windshield connected to the vehicle brakes for indicating to pedestrians and other drivers when the driver has applied his brake. None of these prior workers suggest combining the front brake light with the turn or running light of the automobile in order to provide a change in visual signal to the front and side as the brakes are being applied. These and other disadvantages of the prior art have been overcome according to the present invention.

SUMMARY OF THE INVENTION

The present invention comprises, for example, a front and forward side mounted, combination brake/running/turn signal light which will provide a visible change in signal as the vehicle brakes. The main objective of the present invention is to provide persons to the front and side of an automobile with a strong visual indication that the vehicle is braking. Additionally, means may be provided to give a further indication as to how hard it is breaking.

According to one preferred embodiment, an assembly with two light chambers is provided. The chambers are optically isolated from each other so that, for example, light from one chamber does not illuminate the other. The light in one chamber is connected to the ignition and brake circuits of the vehicle. Connection is made so that this first light lights when the vehicle is operating and goes out when the brakes are applied. The light in the other chamber is connected to the brake circuit of the vehicle. This second light is lighted, for example, whenever the brakes are applied. Varying intensity of the application of the brakes may be indicated by a proportional varying of the intensity of this light.

Thus, the assembly provides a visual signal that is white whenever the vehicle is in operation, changes from white to blue when the brakes are applied and changes from blue back to white again when the use of brakes is terminated. This assembly can be provided as a kit for retrofitting of existing vehicles or as a sub-component to be assembled into a specially provided body cavity at original manufacture. This assembly is intended to be attached to the front and forward sides of the vehicle.

In a variation of this embodiment, the first light is connected to the turn signal circuit of the vehicle. The preferred color for turn signal lights is amber. Also turn signals commonly flash. Thus, in this case the assembly will provide a blue signal when the brakes are applied and a flashing amber signal when the vehicle is turning. Again this variation can be provided as a kit or a sub-component and is intended to be attached to the front and forward sides of the vehicle.

In a second embodiment, an assembly with three light chambers is provided. The chambers are optically isolated from each other so that light from one chamber does not illuminate the other. The light, for example, in one chamber is connected to the ignition and brake circuits of the vehicle. Connection is made so that this first light lights when the vehicle is operating and goes out when the brakes are applied. The light in the second chamber is connected to the brake circuit of the vehicle. This second light is lighted whenever the brakes are applied. The light in the third chamber is connected to the turn signal circuit of the automobile which operates in the normal fashion.

Thus the assembly provides a visual signal that is white whenever the vehicle is in operation, changes from white to blue when the brakes are applied, changes from blue back to white again when the use of brakes is terminated and in addition flashes amber when the vehicle is turning. This assembly can be provided as a kit for retrofitting of existing vehicles or as a sub-component to be assembled into a specially provided body cavity at original manufacture. This assembly is intended to be attached to the front and forward sides of the vehicle.

The color of light emitted by the different chambers is engineered either by providing standard, automotive incandescent bulbs covered by different colored lenses or providing light emitting diodes which glow in different colors. As an alternate, the light sources may be provided via fiber optic cables running to a central source of illumination (see U.S. Pat. No. 5,111,183). The preferred colors are blue for the stop signal, white or clear for the running signal and amber for the turn signal.

A third embodiment employs a single electrochromic element. These elements glow with different colors depending upon whether a positive or negative voltage is applied. Electrochromic elements are typically made of tungsten trioxide. With appropriate circuitry attached to the brake and ignition circuits of the vehicle, the element could be made to glow white whenever the vehicle is in operation; to change from white to blue whenever the brakes are applied; and to change from blue back to white whenever the brakes are disengaged. In a variation of this embodiment, the electrochromic element can be combined with a turn signal lamp in a single assembly. Thus a flashing amber turn signal can also be supplied.

Another variation can be made with any of the above embodiments. In this variation, for example, a pair of the above embodiments are mounted on the front of the vehicle close to the sides and a monochromatic light is attached generally in the front and center of the vehicle. This monochromatic light is only attached to the brake circuit of the vehicle and preferably provides a blue light. Thus this monochromatic, front and center mounted light reinforces the front braking signal provided by the side mounted assemblies.

Retrofitting of existing vehicles may be accomplished, for example, by building the light system of this invention into a bumper and replacing the front bumper of the vehicle with the light containing bumper. Alternatively retrofitting may be accomplished by mounting individual fixtures about the front and forward sides of the vehicle in whatever locations are most visible for a particular vehicle.

The safety of vehicle operation is considerably improved by the application of the principals of the present invention. A visual forewarning is provided to pedestrians and operators of other vehicles as to a drivers intentions as soon as action to implement those intentions is initiated.

An appreciation of the other aims and objectives of the present invention and a more complete and comprehensive understanding of it may be achieved by referring to the accompanying drawings and studying the following description of a preferred embodiment.

DETAILED DESCRIPTION OF THE PREFERRED EMBODIMENT

The following description of the specific and preferred embodiments which have been selected is provided for purposes of illustration only and not limitation.

Figure 1:
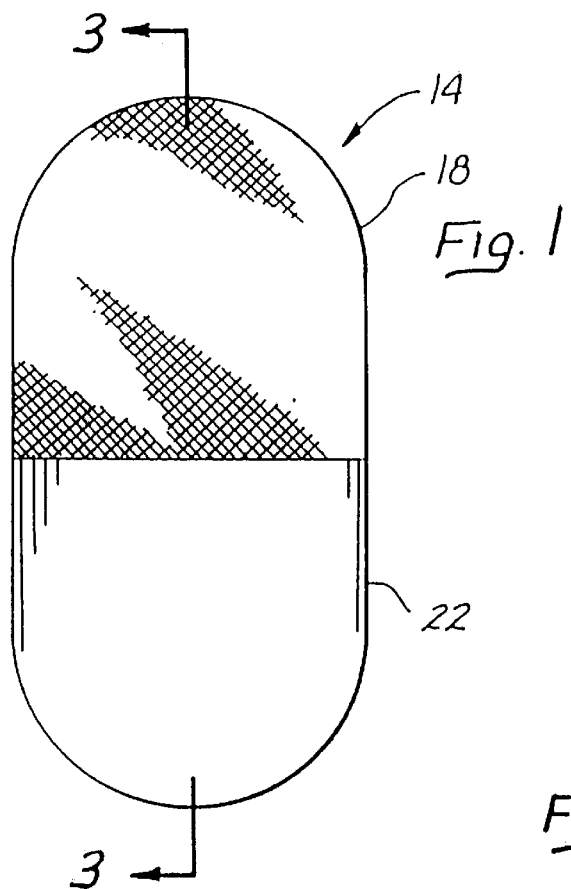
FIG. 1 is a top view of the two-lamp, turn/stop light embodiment of this invention.

FIG. 1 shows a top view of the two-lamp, turn/stop light embodiment of this invention generally at 10. It can be seen that the lens 14 has a blue section 18 and an amber section 22. The lens 14 is manufactured in accordance with the well known art of manufacturing automotive lenses.

Figure 2:
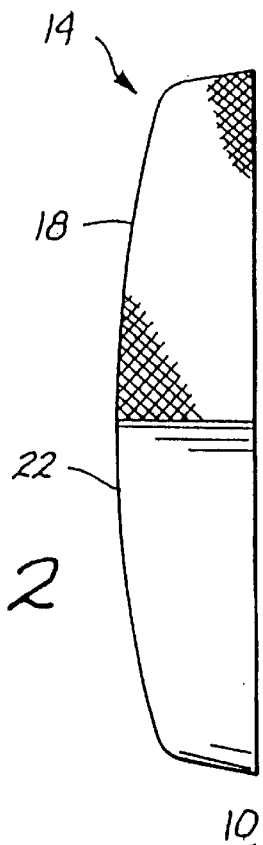
FIG. 2 is a side view of the two-lamp, turn/stop light embodiment of this invention.

FIG. 2 is a side view of the two-lamp, turn/stop light embodiment of this invention 10 again showing that the lens 14 is divided into a blue 18 and amber 22 section.

Figure 3:
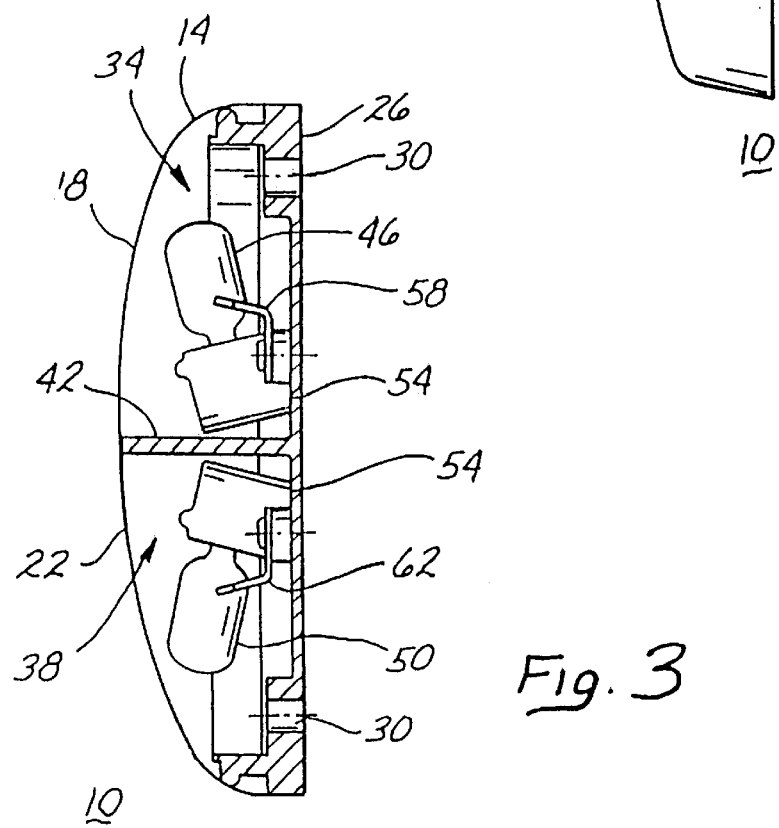
FIG. 3 is a cross-sectional view of the two-lamp, stop/turn light embodiment of the invention along the lines shown in FIG. 1.

FIG. 3 is a cross-sectional view of the two-lamp, stop/turn light embodiment of the invention 10 along the lines shown in FIG. 1. The invention 10 has a base 26 with several mounting holes 30 for attachment to the body of a vehicle. The base is divided into two chambers 34, 38 by a separator 42. Inside the first chamber 34 is a bulb 46 inserted into a lamp holder 54 attached to the base 26. An electrical connection 58 connects this bulb 46 to the brake circuit of the vehicle. Inside the second chamber 38 is a bulb 50 inserted into a lamp holder 54 attached to the base 26. An electrical connection 62 connects this bulb 50 to the turn signal circuit of the vehicle. The lamps 46, 50 and holders 54 are standard automotive components. The invention 10 can be fabricated as a kit for retrofitting an existing automobile or as a sub-component for assembly into a specially designed body cavity as the automobile is being assembled at the factory.

In operation, the embodiment 10 shown in FIG. 3 provides a blue visual signal whenever the brakes are applied and a flashing amber signal when the vehicle is turning.

In an alternate of this embodiment the lens 22 is clear or white and the light 50 in the second chamber is connected to the ignition and brake circuits so that the lamp 50 is lit when the vehicle is operational and goes out when the brakes are applied. Thus the alternate embodiment provides a visual signal that is white whenever the vehicle is in operation, changes from white to blue when the brakes are applied, and changes from blue back to white again when the use of brakes is terminated.

In variations on these embodiments, illumination can be provided by a fiber optic cable (FOC) conducting light from a central source or by light emitting diodes (LEDs). If light emitting diodes are used, a multicolored lens 14 may be unnecessary.

Figure 4:
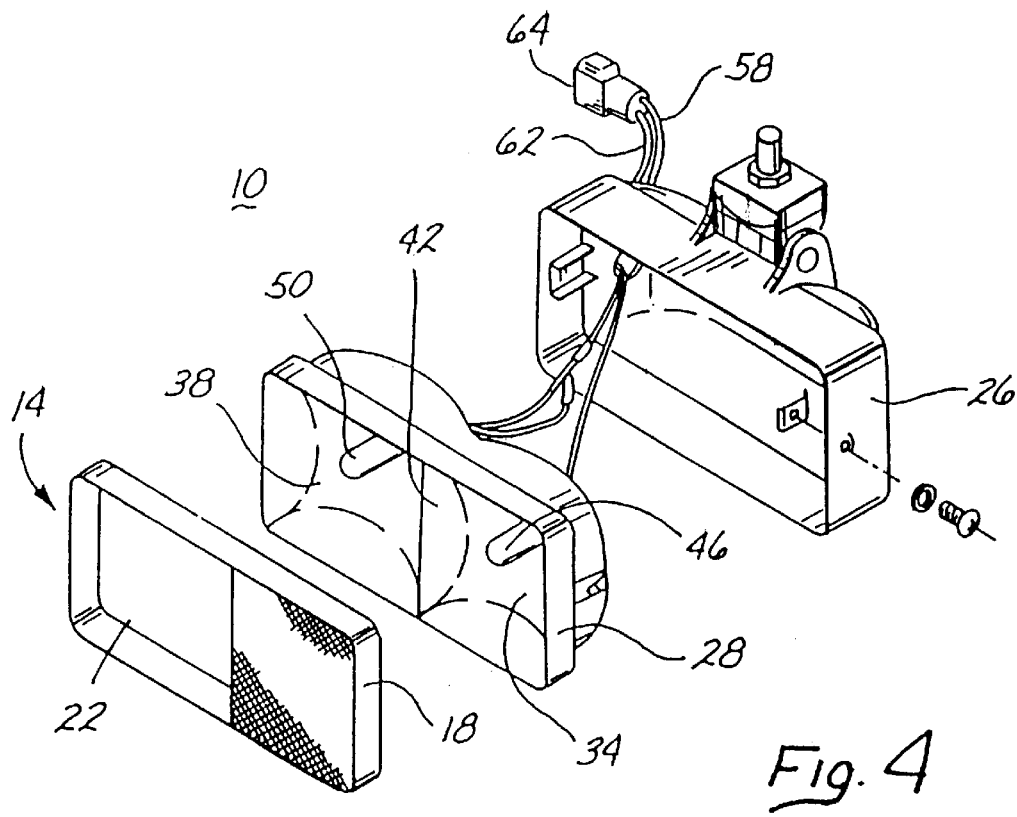
FIG. 4 is an exploded view of a two-lamp, stop/turn light embodiment.

FIG. 4 is an exploded view of a two-lamp, stop/turn light embodiment 10. FIG. 4 illustrates features that were not amenable of illustration on FIGS. 1, 2 and 3. FIG. 4 additionally shows a reflector 28 which is fastened into the base 26. Also shown are the wires 58, 62 which connect to the lamps 46, 50 and the connector 64 for connection to the internal circuitry of the automobile.

Figure 5:
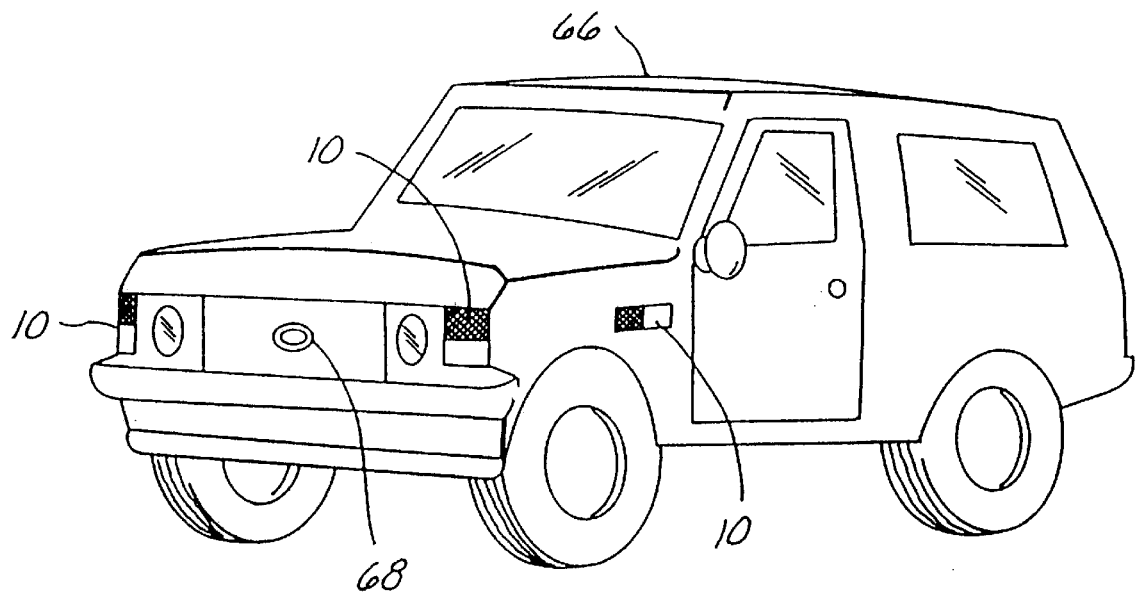
FIG. 5 shows how two-lamp embodiments of this invention can be mounted on an automobile.

FIG. 5 shows how two-lamp embodiments of this invention 10 can be mounted on an automobile 66. Preferred locations are the front corners and sides. In a variation of this embodiment, a monochromatic brake light 68 can be mounted in the front center of the automobile 66. In fact, this monochromatic light 68 can be incorporated into the vehicle logo. Thus, strong visual signals can be seen from the front and sides of the vehicle.

Figure 6:
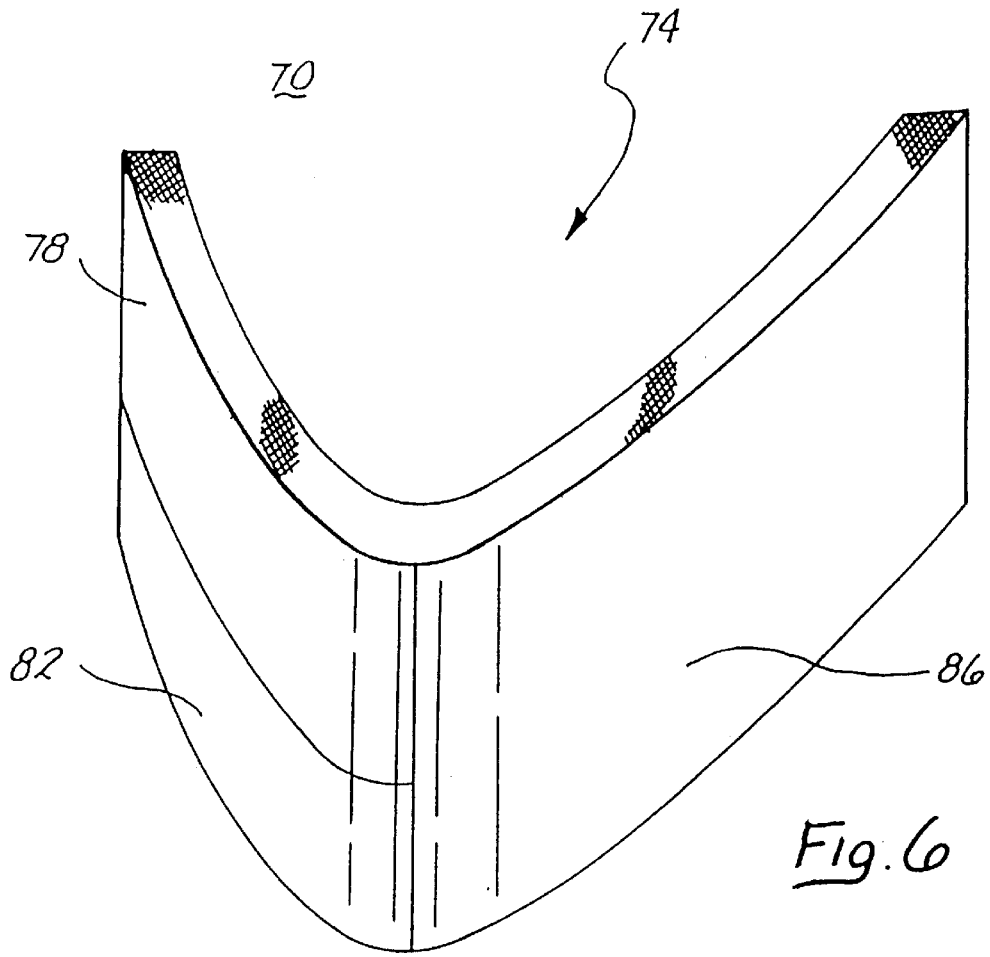
FIG. 6 is a perspective view of a three lamp, wrap-around embodiment of this invention.
Figure 12:
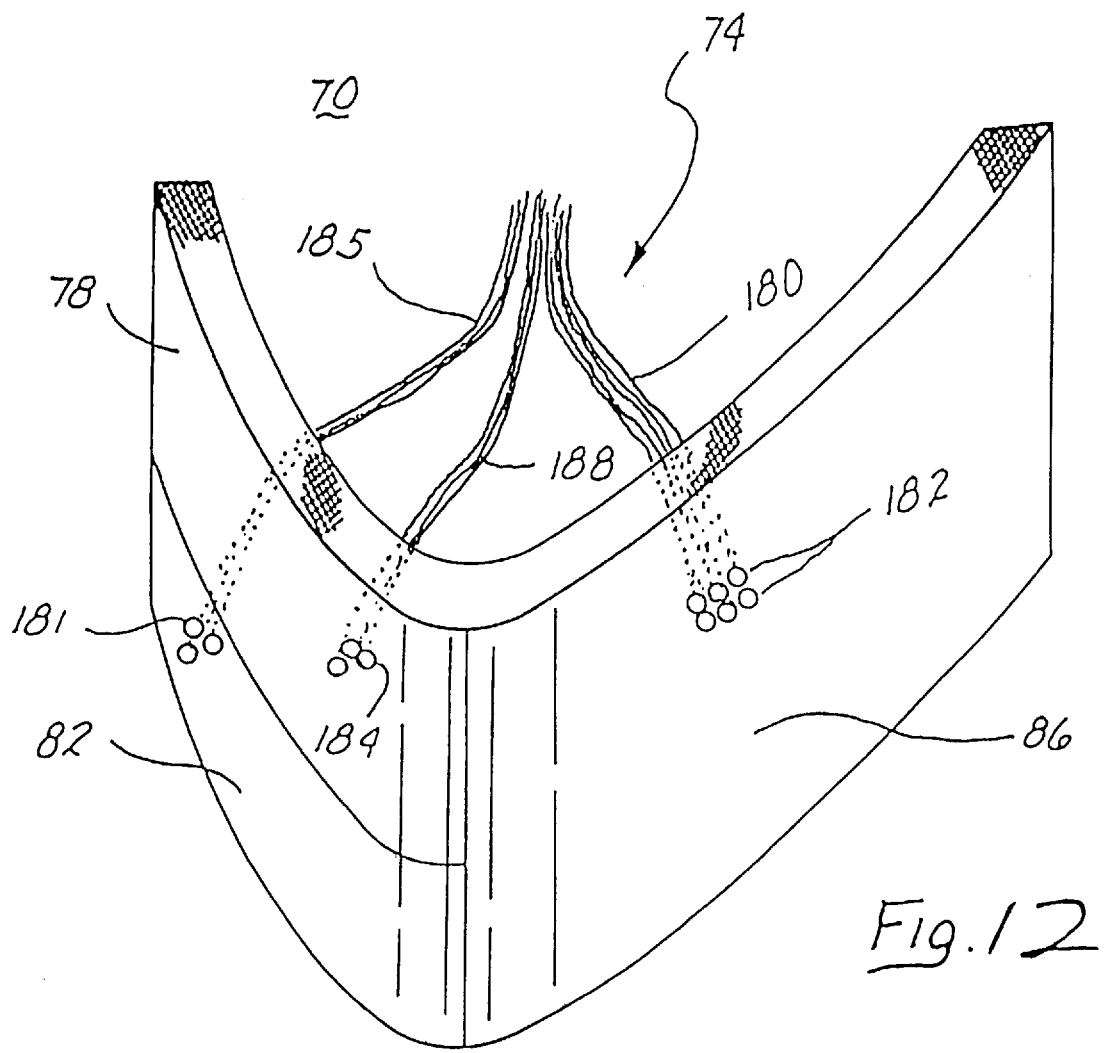
FIG. 12 is a view of the embodiment of FIG. 6 showing fiber optic illumination of the three lenses.

FIG. 6 shows a perspective view of the second embodiment 70 of this invention which has three lamps. The integral lens 74 of this three-lamp version has blue 78, clear 82 and amber 86 sections. These are intended to provide stop, running and turn signals respectively. The interior of the three-lamp version is entirely analogous to the interior of the two-lamp version. See FIG. 3. The three-lamp embodiment can be provided as a retrofit kit or subassembly. Also, various light sources can be used such as incandescent bulbs, LEDs or FOC. FIG. 12 illustrates the illumination of the three sections by fiber optic cables. The terminal ends 181 of a bundle of fiber optic cables 185 serve to illuminate clear section 82. The terminal ends 184 of a bundle of fiber optic cables 188 serve to illuminate blue section 78, and the terminal ends 182 of fiber optic cable bundle 180 serve to illuminate amber section 186. As is conventional, sufficient terminal ends will be provided to illuminate as much of the respective sections as is desired to be illuminated. See above for more detailed description.

Figure 7:
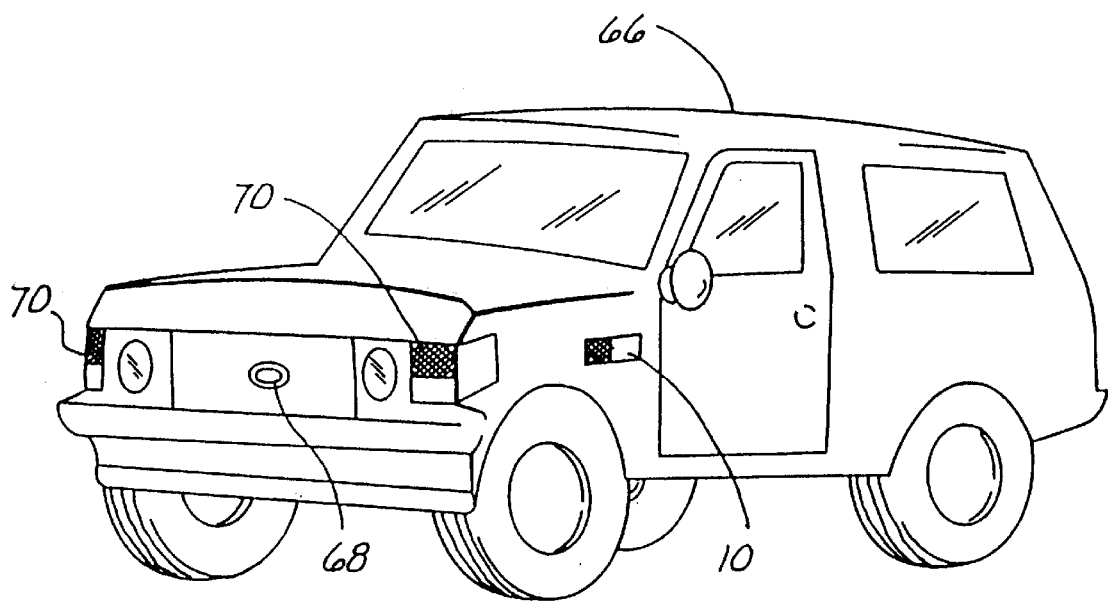
FIG. 7 shows how three-lamp embodiments of this invention can be mounted on an automobile.

FIG. 7 shows how the three-lamp embodiment 70 can be mounted on the front corners of the automobile 66. In this embodiment too a monochromatic brake light 68 can be mounted in the front center of the automobile 66. The vehicle signaling light assemblies may be mounted on opposite front sides of the vehicle.

Figure 8:
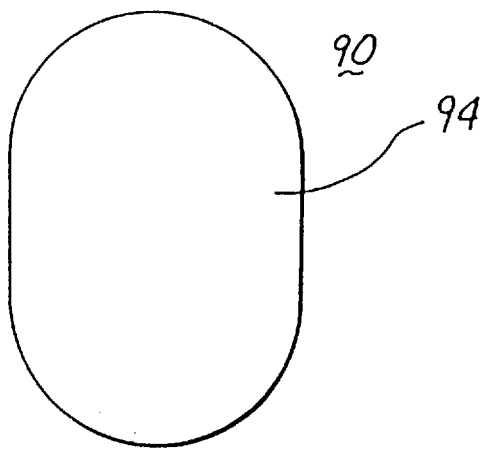
FIG. 8 is a top view of the electrochromic element version of this invention.

FIG. 8 shows the third embodiment of this invention 90 which employs a single electrochromic element 94. Electrochromic elements composed, for example, of tungsten trioxide, glow with different colors depending upon whether a positive or negative voltage is applied. With appropriate circuitry attached to the brake and ignition circuits of the vehicle, the element 94 will glow white whenever the vehicle is in operation; will change from white to blue whenever the brakes are applied; and will change from blue back to white whenever the brakes are disengaged.

Figure 9:
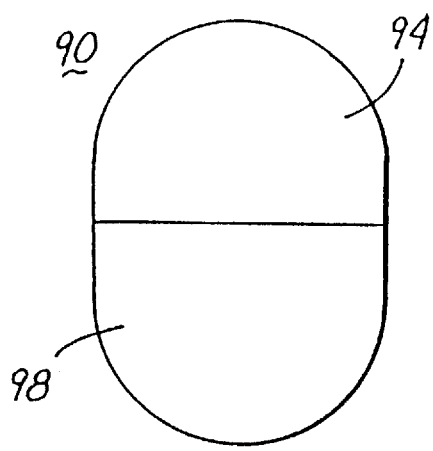
FIG. 9 shows the electrochromic version of this invention combined with a regular turn signal lamp.

FIG. 9 shows a variation of this embodiment 90. In this variation the electrochromic element 94 is combined with a turn signal lamp 98 in a single assembly. Thus a flashing amber turn signal can also be supplied. The turn signal lamp 98 can be constructed in one of the ways already described. See FIG. 3 and descriptions above.

This embodiment 90, too, can be provided as a kit for retrofitting existing automobiles or as a subassembly for original manufacture.

Figure 10:
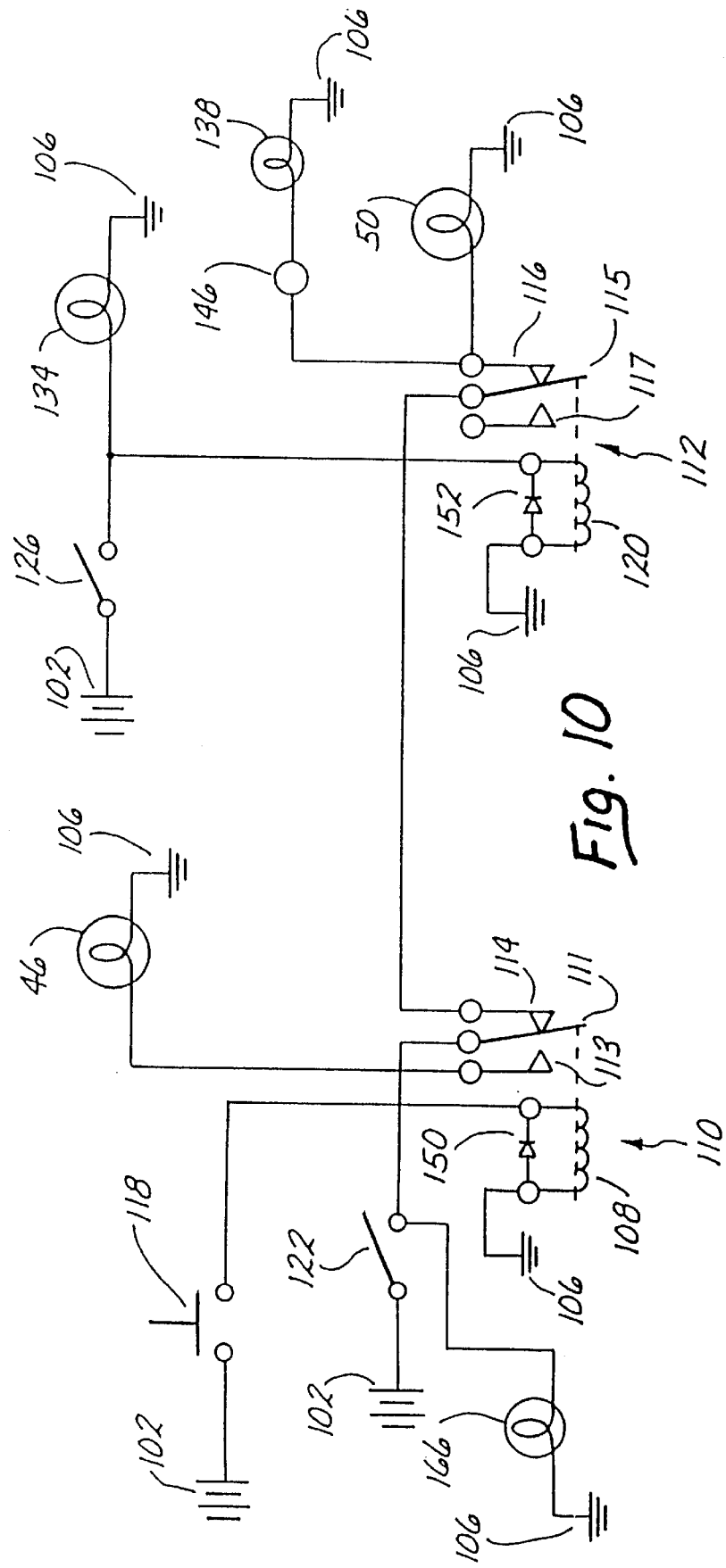
FIG. 10 shows a typical circuit diagram for electrical connection of this invention to the ignition and brake circuits of the vehicle.

FIG. 10 shows a typical circuit diagram for electrical connection of a two-lamp, stop/running light embodiment of this invention 10 to the ignition and brake circuits of the vehicle 66. The vehicle power 102 is connected through a brake switch 118 to the coil 108 of a first relay 110 and then to ground 106. This coil 108 is fitted with a diode 150 to prevent surges. Vehicle power 102 is connected through the headlight switch 126 to the headlights 134 and then to ground 106. A circuit parallel to the headlight circuit goes to the coil 120 of a second relay 112 and then to ground 106. This coil 120 is fitted with a diode 152 to prevent surges. Vehicle power is connected via the ignition switch 122 to the armature 111 of the first relay 110. The armature 111 of the first relay 110 is connected to the tail and marker lights 166 and then to ground 106. One contact 113 of this relay 110 is connected to the brake light 46 of this invention 10 and then to ground 106. The second contact 114 of this relay 110 is connected to the armature 115 of the second relay 112. One contact 116 of this relay 112 is connected to a dimmer 146 and indicator light 138, and then to ground 106. A parallel circuit connected to this contact 116 goes to the daytime running light 50 of this invention 10 and then to ground. In FIG. 10, both relays 110, 112 are show in their normal, un-energized states, i.e. no power to their coils 108, 120.

In the circuit shown in FIG. 10, after the ignition switch 122 is closed, power will flow through both relays 110, 112 and the daytime running light 50 will initially be energized. When the brake switch 118 is closed, the coil 108 in the first relay 110 will be energized, flipping the armature 111 from the first contact 114 to the second contact 113. This will switch power from the daytime running light 50 to the brake light 46.

When the headlight switch 126 is closed, in addition to powering the headlights 134, coil 120 of the second relay 112 will be energized thus swinging the armature 115 from the first contact 116 to the second contact 117. This interrupts the power supply to the daytime running light 50.

An additional feature shown on FIG. 10 is an indicator light 130 and dimmer 146. This circuit is connected in parallel to the daytime running light 50. In consequence, whenever the running light 50 is on, the indicator 138 will also light. The indicator light is mounted on the dashboard to indicate to the driver that the daytime running light 50 is operating properly. The dimmer 146, mounted close to the indicator 138 is provided for adjusting the intensity of the indicator light 138.

Figure 11:
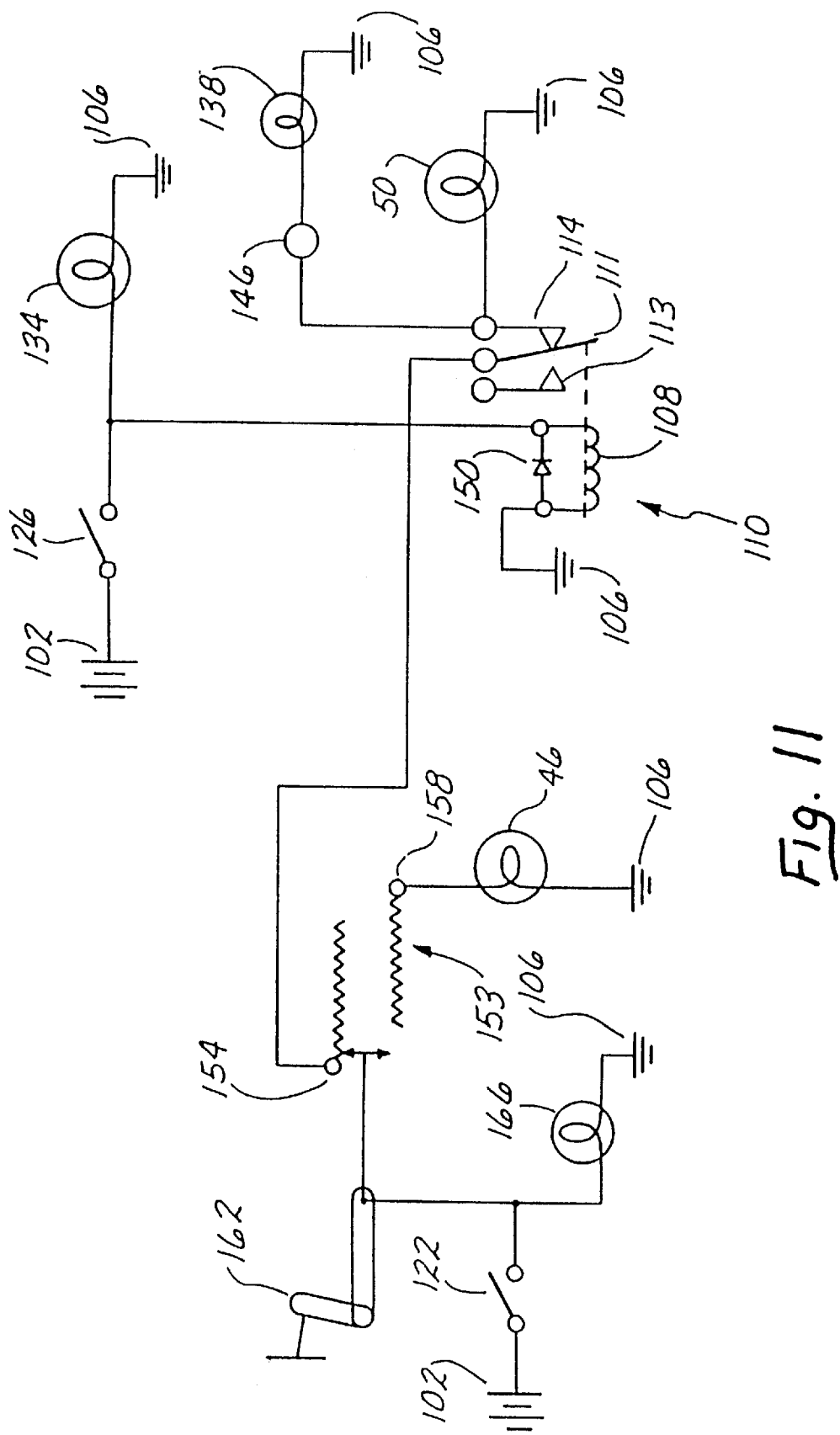
FIG. 11 is a modification of the circuit to include variation in intensity of the lamps with variation in braking force.

FIG. 11 shows a circuit which includes the ability to vary the intensity of the lamps 46, 50 with variation in braking force. The vehicle power 102 is connected through the ignition switch 122 to two branches. On branch goes to the tail and marker lights 166 and then to ground. The second branch goes to a double rheostat 153 which is connected to and activated by the brake hydraulic system 162. The double rheostat comprises two rheostats 154, 158 coupled to each other in inverse directions: i.e. as one increases voltage, the other decreases and vice-versa. One rheostat 158 is connected to the brake light 46 of this invention 10 and then to ground 106. The other rheostat is connected to the armature 111 of a relay 110. One contact 114 of this relay 110 is connected to a dimmer 146 and indicator light 138, and then to ground 106. A parallel circuit connected to this contact 114 goes to the daytime running light 50 of this invention 10 and then to ground 106. Vehicle power 102 is connected through the headlight switch 126 to the headlights 134 and then to ground. A circuit parallel to the headlight circuit goes to the coil 108 of the relay 110 and then to ground 106. This coil 108 is fitted with a diode 150 to prevent surges. In FIG. 11, the relay 110 is shown in its normal, un-energized state, i.e. no power to the coil 108. Also in FIG. 11 the double rheostat 153 is shown in the normal position, i.e. when no braking force has been applied. In this position rheostat 154 is in the full on position and rheostat 158 is in the full off position.

In the circuit shown in FIG. 11, after the ignition switch 122 is closed, power will flow through the rheostat 154 and the relay 110 and the daytime running light 50 will initially be energized with full intensity. When the brakes are partially applied, the rheostat 153 will be moved. This will move rheostat 154 to a less than full on position and rheostat 158 to a more than full off position. In consequence, the brake light 46 will start to glow with some intensity and the daytime running light 50 will lessen in intensity. When the brakes are fully applied, rheostat 154 will come to a full off position and rheostat 158 will come to a full on position. As a consequence the brake light 46 will glow with maximum intensity and the daytime running light 50 will be extinguished.

When the headlight switch 126 is closed, in addition to powering the headlights 134, coil 108 of the relay 110 will be energized thus swinging the armature 111 from the first contact 114 to the second contact 113. This interrupts the power supply to the daytime running light 50.

The circuit shown on FIG. 11 has the additional indicator light 130 and dimmer 146 which was fully described above. FIGS. 10 and 11 illustrate several different ways in which this invention 10 can be connected to the brake and ignition circuits of an automobile 66. It should be obvious to those skilled in the art to which this invention pertains that other, similar connecting circuits can be designed. Indeed, circuits based on microprocessors can easily be designed.

Several preferred embodiments 10, 70, 90 of the automotive front and side brake and turn signal light have been described for purposes of illustration. However, as will be understood by those skilled in the art to which this invention pertains that other modifications and enhancements, reversals and substitutions, and the like, can be made without departing from the spirit and scope of the claims that follow.

What is claimed is:

1. A vehicle signaling light assembly adapted to be mounted on the front or forward sides of a vehicle, said vehicle including a braking system, and brake, turning and ignition circuits comprising:

a base member, said base member including a turn light chamber, a signal light chamber and a stop light chamber, said respective chambers being substantially optically isolated from each other, said chambers being adapted to emit different colored light;

a first signal illuminating arrangement, associated with and adapted to illuminate said signal light chamber, said first signal illuminating arrangement being adapted to being operatively connected to said ignition and brake circuits of said vehicle so that said first signal illuminating arrangement illuminates said signal light chamber most intensely whenever said ignition circuit is activated and said brake circuit is not activated;

a stop signal illuminating arrangement, associated with and adapted to illuminate said stop light chamber, said stop signal illuminating arrangement being adapted to being operatively connected to said brake circuit of said vehicle so that said stop signal illuminating arrangement illuminates said stop light chamber only when said brake circuit is activated by application of braking force to said vehicle; and a turn signal illuminating arrangement, associated with and adapted to illuminate said turn light chamber; said turn signal illuminating arrangement being adapted to being operatively connected to said turn light circuit of said vehicle so that said turn signal illuminating arrangement illuminates said turn light chamber whenever said turn light circuit is activated.

2. A vehicle signaling light assembly of claim 1 wherein said base member is adapted to be attached to said front or forward sides of said vehicle.

3. A vehicle signaling light assembly of claim 1 including a light intensity control device, whereby the intensity of the illumination provided by said stop signal illuminating arrangement is adapted to vary directly with the amount of braking force applied to said vehicle, and the intensity of the illumination provided by the first signal illuminating arrangement is adapted to vary inversely with the amount of braking force applied to said vehicle.

4. A vehicle signaling light assembly of claim 1 in which said vehicle signaling light assembly includes a first lens element having a first color over said signal light chamber a second lens element having a second color over said stop light chamber and a third lens element having a third color over said turn light chamber.

5. A vehicle signaling light assembly of claim 4 wherein said first color is generally white, said second color is generally blue and said third color is generally yellow or amber.

6. A vehicle signaling light assembly of claim 4 wherein said first, second and third lens elements are integral with one another.

7. A vehicle signaling light assembly of claim 1 wherein said first signal illuminating arrangement includes an incandescent signal lamp.

8. A vehicle signaling light assembly of claim 1 wherein said first signal illuminating arrangement includes a fiber optic signal light conductor.

9. A vehicle signaling light assembly of claim 1 wherein said stop signal illuminating arrangement includes an incandescent stop lamp.

10. A vehicle signaling light assembly of claim 1 wherein said stop signal illuminating arrangement includes a fiber optic stop light conductor.

11. A vehicle signaling light assembly of claim 1 wherein said turn signal illuminating arrangement includes an incandescent turn lamp.

12. A vehicle signaling light assembly of claim 1 wherein said turn signal illuminating arrangement includes a fiber optic turn signal light conductor.

13. A vehicle signaling light assembly of claim 1 including a light intensity control device, whereby said first signal illuminating arrangement is adapted to being illuminated only when no braking force is being applied to said vehicle.

14. A vehicle signaling light assembly of claim 1 including a pair of said vehicle signaling light assembly adapted to be mounted on opposite front sides of said vehicle, and a monochrome light assembly adapted to be mounted on the front of said vehicle, said monochrome light assembly being operatively connected to said brake circuit so that said monochrome light assembly is illuminated only when said brake circuit is activated by the application of braking force to said vehicle.

15. A vehicle signaling light assembly of claim 14 wherein said monochrome light assembly is adapted to emit generally blue light.

16. A vehicle signaling light assembly of claim 1 in which said first signal illuminating arrangement comprises a first light emitting diode which glows a first color, said stop signal illuminating arrangement comprises a second light emitting diode which glows a second color, and said third turn signal illuminating arrangement comprises a third light emitting diode which glows a third color.

17. A vehicle signaling light assembly of claim 16 wherein said first color is generally white and said second color is generally blue and said third color is generally yellow or amber.

* * * * *